United States Patent [19]

Sleep

[11] 4,005,787
[45] Feb. 1, 1977

[54] APPARATUS AND METHOD FOR UNLOADING DRIVERLESS VEHICLES

[75] Inventor: Craig F. Sleep, Bangor, Pa.

[73] Assignee: SI Handling Systems, Inc., Easton, Pa.

[22] Filed: July 3, 1975

[21] Appl. No.: 592,953

[52] U.S. Cl. .................................. 214/58; 198/637
[51] Int. Cl.² ........................................ B65G 67/24
[58] Field of Search ...................... 214/58, 59, 152; 198/21, 20 R, 24, 185, 188; 104/48, 49, 50, 252, 253

[56] References Cited
UNITED STATES PATENTS

| | | | |
|---|---|---|---|
| 2,525,953 | 10/1950 | Saxe | 198/21 |
| 2,813,648 | 11/1957 | Pettit | 198/21 X |

Primary Examiner—Albert J. Makay
Attorney, Agent, or Firm—Seidel, Gonda & Goldhammer

[57] ABSTRACT

Apparatus and method are disclosed for automatically unloading a driverless vehicle while the vehicle is moving along a guided path. The propulsion force of the vehicle is used to effect the unloading. A cantilever arm projects across the guided path for the driverless vehicle and is pushed out of the way by the vehicle. The pushing of the cantilever arm by the vehicle causes a sweep arm to traverse at least a portion of the vehicle deck thereby pushing a load off the deck onto a receiver such as a conveyor. The cantilever arm and sweep arm are selectively connected together whereby vehicles which are not to be unloaded may traverse the location of the unloader without effecting movement of the sweep arm.

14 Claims, 5 Drawing Figures

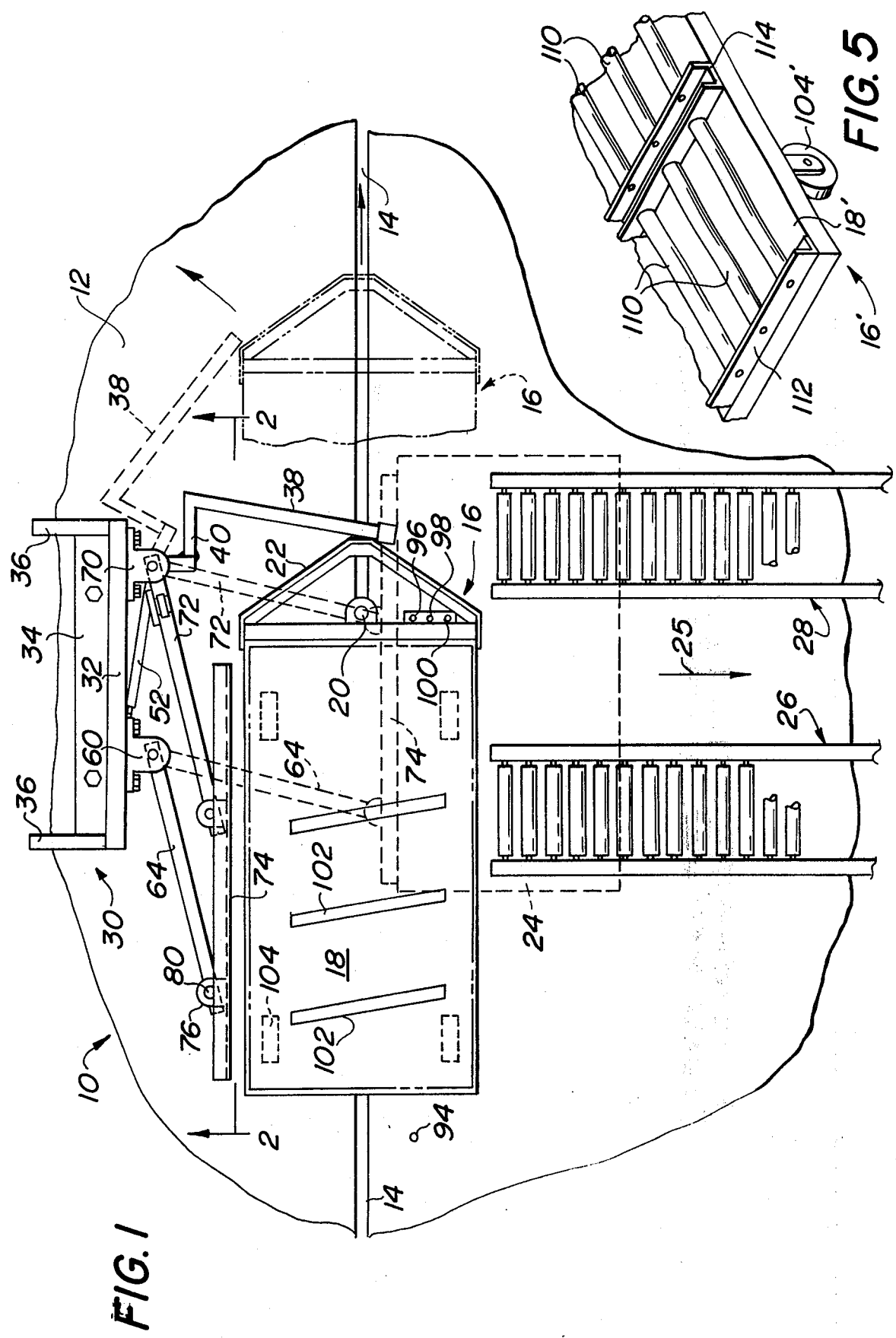

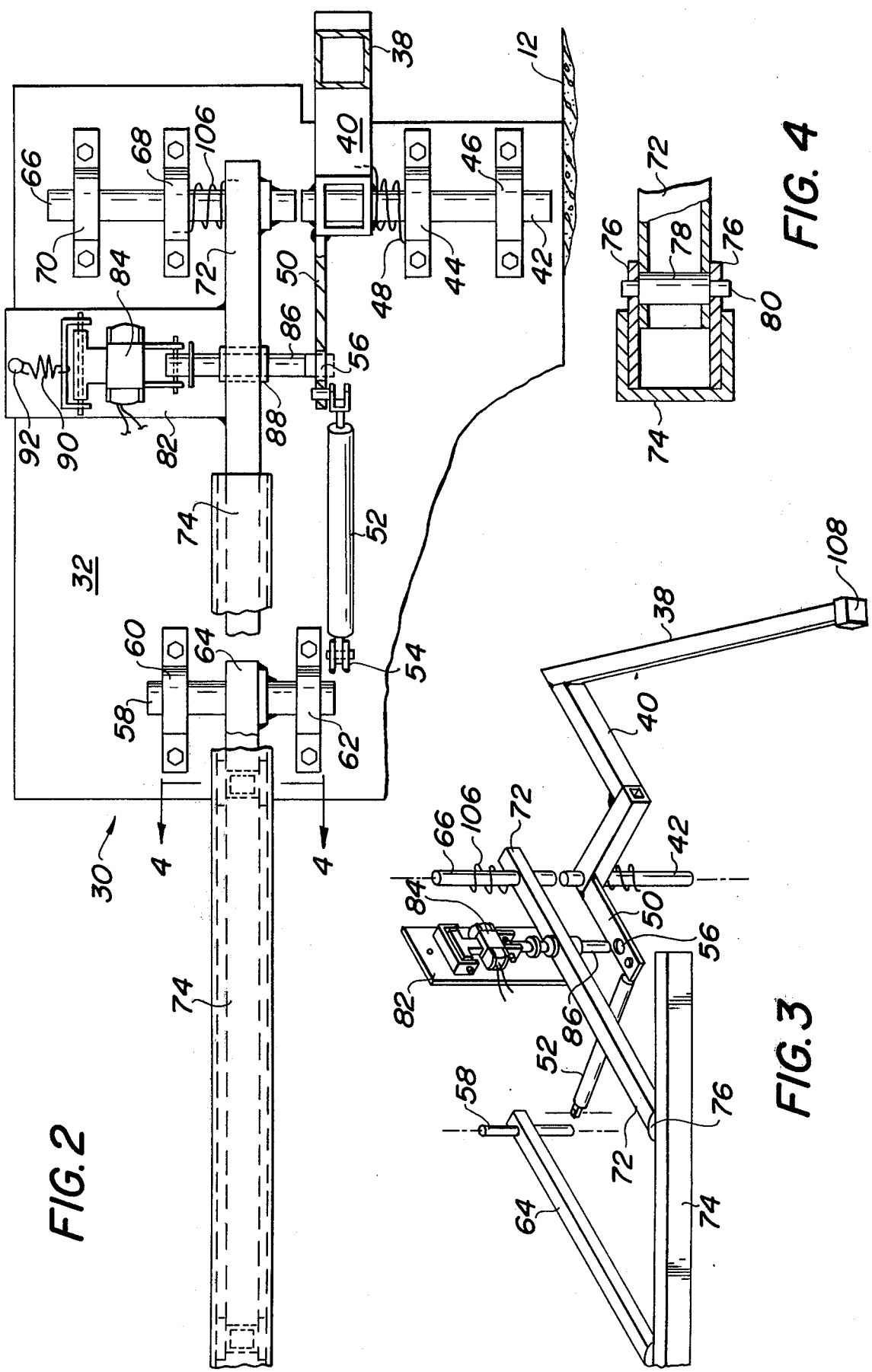

APPARATUS AND METHOD FOR UNLOADING DRIVERLESS VEHICLES

BACKGROUND

Heretofore, devices for unloading vehicles generally require the vehicle to halt and then a motorized device pushes a load off the vehicle onto a receiver such as a discharge conveyor. For example, see U.S. Pat. Nos. 2,885,969 and 2,893,535. Structure as exemplified by said patents requires an independent motorized power source, and a large number of components to effect the unloading of the vehicle after the vehicle has halted.

The present invention overcomes the disadvantage of requiring an independent source of power by utilizing the propulsion force of the vehicle to selectively effect unloading by means of structure which is simple and reliable.

The present invention is directed to apparatus and method of unloading a driverless vehicle without stopping the vehicle. The apparatus includes a vertical support adapted for installation alongside a guided path for driverless vehicles. A cantilever arm is pivoted at one end to the vertical support and projects across the guided path. A vehicle moving along the path pushes the cantilever arm out of its way thereby moving the arm from an extended position to a retracted position.

A sweep arm is supported by the support at an elevation so that it can move from a retracted position to an extended position and push a load off the deck of a vehicle. A means is provided for connecting the cantilever arm to the sweep arm so that the sweep arm moves to its extended position when the cantilever arm is moved to its retracted position.

The method of the present invention involves unloading a driverless vehicle without stopping the vehicle. The method of the present invention uses the propulsion of the vehicle as it moves along the guided path to cause the sweep arm to push the load off the vehicle onto a receiver. Thus, the present invention enables a driverless vehicle to be unloaded "on the fly."

It is an object of the present invention to provide apparatus and method for effecting an unloading of a driverless vehicle moving along a guided path without stopping the vehicle and without using a separate source of power other than the propulsion force of the vehicle.

It is another object of the present invention to provide apparatus and method for selectively unloading vehicles as they move past an unloading point while permitting other vehicles to traverse the unloading zone without being unloaded.

It is another object of the present invention to provide novel apparatus and method for unloading vehicles which is simple, inexpensive, and reliable for unloading tow line vehicles on the fly.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a top plan view of a tow line system incorporating the present invention.

FIG. 2 is a view taken along the line 2—2 in FIG. 1.

FIG. 3 is a perspective view of the arms of the unloader.

FIG. 4 is a sectional view taken along the line 4—4 in FIG. 2.

FIG. 5 is a partial perspective view of a vehicle adapted to be used in a system in accordance with this invention.

Referring to the drawing in detail, wherein like numerals indicate like elements, there is shown in FIG. 1 a portion of the tow line system designated generally as 10. The system 10 includes a floor 12 or other support surface having a guided path for driverless vehicles. The guided path is preferably in the form of a main slot 14 which may be intersected at spaced points therealong by shunt slots in a manner which is well known to those skilled in the art of tow line systems.

A vehicle 16 of the driverless type is provided for the system 10. The vehicle 16 includes a tow pin 20 which is vertically disposed and depends from a front end of the vehicle 16. The tow pin 20 extends downwardly through the main slot 14 for contact at its lower end with a conveyor. Contact between the tow pin 20 and the conveyor constitutes the means for propelling the vehicle 16 along the main slot 14 and the tow pin also guides the vehicle by its cooperative relationship with the slot 14.

The vehicle 16 has a flat deck 18 on which is adapted to be placed a load 24. A bumper 22 is provided on the front end of the vehicle 16. The bumper 22 is preferably defined by channel members which diverge from an apex to the front corners of the vehicle 16. The apex of the bumper 22 may be rounded or flattened.

A receiver is provided for receiving the load 24 when it is transferred off the deck 18 in the direction of arrow 25. The receiver is preferably in the form of discharge conveyors 26 and 28 parallel to one another. One discharge conveyor may be used in place of two. The conveyors 26 and 28 are preferably inclined downwardly from their upper ends illustrated in FIG. 1 so that the load 24 will move in the direction of arrow 25 due to gravity. If desired, the conveyors 26 and 28 may be independently powered. The receiving end of the conveyors 26, 28 is preferably at an elevation slightly below the elevation of the deck 18.

An unloader designated generally as 30 is supported by the floor 12 generally opposite the conveyors 26, 28 and on the opposite side of the main slot 14. The unloader 30 is a prefabricated structure having a vertical support 32, preferably has a height of about 3–4 feet and may be constructed in a variety of manners depending upon the mass of the load 24 in a particular system 10. For most systems, the support 32 will be a steel plate having a thickness of about ½ inch and connected to a flange 34 with additional braces 36 being provided. The flange 34 facilitates bolting the unloader 30 to the floor 12. The unloader 30 should be sufficiently rigid and strong so as to resist the reaction forces involved in pushing the load 24 off the deck 18 onto the discharge conveyors 26, 28.

The unloader 30 includes a cantilever arm 38 pivotably supported at one end by the vertical support 32 with its free end projecting across the main slot 14 at the elevation of the bumper 22. Thus, in its extended position the arm 38 substantially traverses the path of the vehicle 16 so that the vehicle 16 must push it out of its way. The retracted position of the arm 38 is shown in phantom in FIG. 1 after it has been pushed out of the way of the vehicle 16 by the vehicle 16.

The preferred embodiment for pivotably supporting the cantilever arm 38 includes welding the arm 38 to one end of a L-shaped arm 40. The other end of the arm 40 is fixedly secured, such as by welding, to a vertically disposed shaft 42. Shaft 42 is supported on the support 32 by bearings 44, 46. A torsion spring 48 extends between the bearing 44 and the arm 40 thereby biasing the cantilever arm 38 to its extended position as shown in solid lines in FIG. 1. The bearings 44 and 46 are preferably mounted within pillow blocks bolted to the support 32.

A wide variety of materials and cross sectional shapes may be utilized for the arms 38 and 40. It is preferred to make the arms 38 and 40 from hollow square tubing such as tubing 2 × 2 inches, 11 guage steel. The shaft 42 is preferably a shaft having a substantial diameter such as a diameter of 1 3/16 inches. These dimensions will vary depending upon the particular system involved and the forces generated to effect an unloading of a vehicle on the fly. Thus, a system designed to effect unloading of cases of can goods from the deck 18 of the vehicle 16 requires a stronger and more rigid unloader 30 as compared with a system designed to unload cases of breakfast cereal.

An extension arm 50, preferably being in the form of a plate, is rigidly secured to the arm 40 or shaft 42 in any convenient manner such as by welding. The end of the arm 50 remote from the shaft 42 is connected to one end of a dash pot 52. The other end of the dash pot 52 is pivotably secured to the support 32. In this manner, movement of the arm 38 between its retracted and extended positions is accomplished at a rate of movement which is controlled by the adjustment of the dash pot 52. In this regard, the arm 38 should not be permitted to snap back from its retracted position to its extended position under the influence of spring 48 but rather should be a steady movement accomplished during a time interval of several seconds.

A suitable bracket 54 may be provided on the support 32 to pivotably support one end of the dash pot 52. The dash pot 52 may be of conventional construction and preferably is of the adjustable type to permit selective variation in the rate of return of the arm 38. The arm 50 is provided with a hole 56 adjacent the end thereof which is pivotably connected to the dash pot 52. The purpose of the hole 56 will be made clear hereinafter.

A vertically disposed shaft 58 is supported by bearings 60 and 62 in pillow blocks bolted to the support 32. One end of a front arm 64 is fixedly secured to the shaft 58 in any convenient manner such as by welding.

A shaft 66 is vertically disposed coaxial with the shaft 42 and supported by bearings 68 and 70 in pillow blocks bolted to the support 32. One end of an arm 72 is fixedly secured to the shaft 66 in any convenient manner such as by welding.

The arms 64 and 72 are of the same length and preferably of the same cross sectional configuration as the arm 38. The free ends of the arms 64 and 72 are pivotably connected to a sweep arm 74. Sweep arm 74 is preferably a channel shape having a vertically disposed side face at an elevation so as to be slightly above the elevation of the deck 18 so that it may push the load 24 off the deck 18. As shown in FIG. 4, arm 72 is connected to the sweep arm 74 by roller bearing 78 extending between upper and lower brackets 76 on the sweep arm 74. Thus, each of the arms 64 and 72 is pivotably connected to the sweep arm 74 for pivotable movement about the longitudinal axis of the pins 80 to thereby provide a parallelogram linkage. It will be noted that the length of the sweep arm 74 is greater than the distance between the pins 80. See FIG. 1. Also, the distance between pins 80 corresponds to the distance between shafts 58 and 66.

A means is provided to selectively interconnect the cantilever arm 38 with the sweep arm 74. Such means may assume a variety of configurations and locations. The preferred construction for such means includes a mounting plate 82 fixedly secured to arm 72 in any convenient manner such as by welding. The plate 82 supports an electrical solenoid 84 having a plunger 86. Plunger 86 extends downwardly through a guide sleeve 88 on the arm 72. When the sweep arm 74 is in its retracted position as shown in solid lines in FIG. 1, and when the cantilever arm 38 is in its extended position as shown in solid lines in FIG. 1, plunger 86 is aligned with but spaced from the hole 56.

The solenoid 84 is preferably of the push type wherein the plunger 86 is biased to an upper position as shown in solid lines in FIG. 2 by means of a spring 90 anchored at its upper end to a stationary anchor 92 on plate 82. When activated, the solenoid 84 causes the plunger 86 to move downwardly through the hole 56 thereby stretching the spring 90. Arms 38 and 74 are now connected.

A switch 94 is supported by the floor 12 upstream of the unloader 30 and is electrically coupled to the solenoid 84. The vehicle 16 is provided with any suitable means for actuating the switch 94. The actuator for the switch 94 is preferably in the form of a selector rod having a magnet or other device at its lower end and selectively positioned in one of the positions 96, 98, 100 at the front end of the vehicle. When the selector rod is in either position 96 or position 100, it will not activate switch 94 whereby the vehicle 16 may traverse the area of the unloader 30 without causing its load 24 to be transferred onto the discharge conveyors 26, 28. When the selector rod is in position 98, it will trip the switch 94 thereby activating the solenoid 84.

The vehicle 16 is mounted on wheels 104. The deck 18 of the vehicle 16 is preferably provided with bearing strips 102 which are spaced from one another and parallel to one another. The bearing strips 102 are preferably angularly disposed as shown in FIG. 1 and are preferably made from a self-lubricating plastic material to thereby minimize the frictional forces between the load 24 and the deck 18. Strips 102 preferably have a thickness of about ⅛ inch and a width of about 2 inches and are secured to the deck 18 in any convenient manner such as by bonding or mechanical fasteners.

Let it be assumed that the selector rod is located at position 98 so that it will activate switch 94 and cause the load 24 to be transferred off the vehicle 16 onto the discharge conveyors 26, 28. Hence, as the selector rod passes over switch 94, solenoid 84 will be activated to cause plunger 86 to move downwardly and through the hole 56 thereby interconnecting sweep arm 74 with the cantilever arm 38. This interconnection is accomplished in less than a second after switch 94 is tripped. Hence the bumper 22 of the vehicle 16 may be between about 6 inches and 15 feet from the cantilever arm 38 when switch 94 is tripped depending on the speed of vehicle 16.

When the approaching vehicle 16 reaches the position shown in FIG. 1, its bumper 22 contacts the cantilever arm 38. The propulsion force of the vehicle 16 as it is being moved along the main slot 14 by the conveyor therebelow and not shown, causes the vehicle 16 to push the arm 38 from its extended position to its retracted position as shown in phantom in FIG. 1. Such pivotable movement of the cantilever arm 38 stretches the spring 48 and moves the sweep arm 74 from its retracted position to its extended position. The retracted position of the sweep arm 74 is shown in solid lines in FIG. 1 and the extended position is shown in phantom in FIG. 1. Since the sweep arm 74 is at an elevation slightly above the elevation of the deck 18, it pushes the load 24 off the deck 18 onto the discharge conveyors 26, 28. Since the vehicle 16 in a tow line system only moves at a rate of speed of about 2 or 3 miles per hour, there is sufficient time to transfer the load 18 so that it is properly received by the discharge conveyors 26, 28.

After the rear end portion of the vehicle 16 has cleared the free end of the cantilever arm 38, the spring 48 causes the arm 38 to pivot from its retracted position back to its extended position at a rate of movement which is controlled by the dash pot 52. At the same time, the sweep arm 74 is returned from its extended position to its retracted position. A timer relay, not shown, interrupts power to the solenoid 84 after an appropriate time delay of about 5 or 6 seconds depending upon the speed of the vehicle 16. When the solenoid 84 is deactivated, the plunger 84 is raised to the position shown in FIG. 1. In order to be certain that the sweep arm 74 has returned to its retracted position, a torsion spring 106 may be provided in association with one of the shafts 58, 66.

The manner in which switch 94 is activated may assume a wide variety of configurations and need not be activated by a selector rod on the vehicle. For example, any detection means or triggering mechanism conventional in the art may be utilized. Likewise, if desired a microswitch may be provided downstream from the unloader 30 for triggering by the vehicle 16 to thereby deactivate the solenoid 84 in place of the use of a timer relay as described above.

The free end of the arm 38 may be provided with a plastic wear tab 108 so that it does not scratch or mar the side face of the vehicle 16. In this regard, the arm 38 while in its retracted position is spring biased against the side face of the vehicle 16 as the vehicle 16 is moving along the main slot 14.

If it is desired to have a particular vehicle 16 to move past the unloader 30 without being unloaded, the selector rod or some other device is utilized whereby the switch 94 is not activated. As a result thereof, the plunger 86 does not move through the hole 56 to interconnect the sweep arm 74 with the cantilever arm 38. Hence, if the vehicle 16 pushes the arm 38 out of its way, the sweep arm 74 remains in its retracted position as shown in FIG. 1. This arrangement enables the load to be unloaded from the vehicle 16 at discharge conveyors other than the conveyors 26, 28 thereby providing selectivity as to the location for unloading. Also, this arrangement facilitates movement of empty vehicles past the unloader 30 without causing movement of the sweep arm 74.

In FIG. 5 there is illustrated a portion of a vehicle 16'. Vehicle 16' is the same as vehicle 16 except as follows. To facilitate the ease of transfer of load 24 off the deck 18', a plurality of rollers 110 may be provided on the deck 18' thereby minimizing the force needed to push a load off the deck 18'. Rollers 110 are used in place of the wear strips 102 when a substantial load such as 1,000 pounds is provided on the vehicle. The rollers 110 are supported for rotation about their longitudinal axes by channels 112, 114 bolted or otherwise secured to deck 18'.

Thus, it will be noted that the apparatus of the present invention is simple, requires little maintenance and is effective to automatically unload a driverless vehicle on the fly while using the propulsion force of the vehicle whereby a separate motive force is not needed to unload a vehicle. Further, it is not necessary to stop the vehicle in order to effect loading. At the same time, selectivity is provided in that empty vehicles do not activate the unloading sweep arm and selective unloading is attained whereby the load may be automatically unloaded at a preselected discharge location. The system as described above, except for the preselection or adjustment by an operator as to the destination for unloading, is completely automatic.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for unloading driverless vehicles while they are moving and for using the propulsion force of the vehicle comprising a vertically disposed support adapted for installation alongside a guided path for driverless vehicles, a cantilever arm pivoted at one end to said support, said arm having an extended position projecting generally horizontally at an elevation for contact with a front end portion of a vehicle so that the vehicle pushes the cantilever arm out of its way thereby pivoting the cantilever arm with respect to said support to a retracted position of said arm, a sweep arm supported by said support at an elevation so that it can move from a retracted position to an extended position and push a load off the deck of a vehicle, and means connecting said cantilever arm to said sweep arm so that the sweep arm moves to is extended position when said cantilever arm is moved to its retracted position by the force imparted to the cantilever arm by the vehicle whereby a separate motive force for the sweep arm is unnecessary.

2. Apparatus in accordance with claim 1 wherein said means connecting said cantilever arm to said sweep arm is selectively disconnectable so that the cantilever arm may be pushed from its extended position by a vehicle to its retracted position without effecting movement of said sweep arm, and means biasing said cantilever arm to its extended position.

3. Apparatus in accordance with claim 2 wherein said connecting means includes a solenoid and plunger on one of said arms, and structure on the other arm for cooperation with said solenoid plunger.

4. Apparatus in accordance with claim 3 wherein said sweep arm is supported by parallelogram linkage from said support.

5. Apparatus in accordance with claim 1 wherein said sweep arm is at an elevation above the elevation of said cantilever arm, spring means biasing said cantilever arm to its extended position, spring means biasing said sweep to its retracted position, said cantilever arm being generally perpendicular to said sweep arm when said cantilever arm is in its extended position and said sweep arm is in its retracted position.

6. Apparatus in accordance with claim 1 wherein said vertical support has an upstream end and a downstream end, said cantilever arm being pivotably supported by said vertical support adjacent its downstrean end, said sweep arm being positioned adjacent the upstream end of said support, whereby the sweep arm may be opposite a side of a vehicle when the cantilever arm is in contact with a front end of a vehicle.

7. A method of unloading a driverless vehicle without stopping the vehicle comprising the steps of providing a guided path of travel for a driverless vehicle, propelling the vehicle along said path, providing an unloader adjacent said path and including a cantilever arm projecting from the unloader transversely across a portion of the path and with a sweep arm which is generally parallel to said path, pushing the cantilever arm out of the path of the vehicle by contact therebetween while using the propulsion force of the vehicle moving along said path, using the force imparted to said cantilever arm by said vehicle to cause said sweep arm to transfer a load off said vehicle onto a receiver, whereby the propulsion force of the vehicle is utilized to unload the vehicle without stopping the vehicle.

8. A method in accordance with claim 7 including activating a switch upstream from said unloader, and releasably interconnecting said cantilever arm with said sweep arm in response to activation of said switch so that the sweep arm transfers the vehicle load onto said receiver only when said switch has been activated, and pushing said cantilever arm out of the way of another vehicle by contact with another vehicle without moving said sweep arm when said switch is not activated.

9. A method in accordance with claim 8 including using a solenoid to selectively interconnect the cantilever arm and the sweep arm, and using a time delay device for deactivating said solenoid.

10. A method in accordance with claim 8 incuding using a discharge conveyor as said receiver, positioning the discharge conveyor at an elevation slightly below the elevation of said sweep arm, and providing a friction reducing support on a deck of the vehicle to facilitate the ease of pushing a load off the vehicle onto said conveyor by said sweep arm.

11. In a system wherein a vehicle is propelled along a main slot by a tow pin extending downwardly from the vehicle through the slot for contact with a conveyor below the elevation of the slot, an unloader alongside the main slot for pushing a load off the vehicle onto a discharge conveyor, the unloader including a sweep arm mounted for movement in a direction generally perpendicular to the main slot and on an opposite side of the main slot from the conveyor, the improvement comprising means for causing the sweep arm to push a load off the vehicle onto the discharge conveyor without stopping the vehicle and while using the propulsion force of the vehicle, said means including a cantilever arm biased to an extended position generally perpendicular to the length of the slot for contact with a bumper on a vehicle whereby such contact will move the cantilever arm out of the path of the vehicle, and means selectively interconnecting said cantilever arm with said sweep arm so that movement of the cantilever arm by a vehicle will cause the sweep arm to move from a retracted position generally parallel to the slot to an extended position wherein it is over a vehicle deck and pushes a load onto the discharge conveyor, means biasing the sweep arm to its retracted position, means biasing the cantilever arm to its extended position, and said sweep arm being supported upstream of said cantilever arm.

12. Apparatus comprising means for unloading driverless vehicles while they are moving along a guided path, said means including a cantilever arm biased to an extended position at an elevation for contact with a portion of a vehicle so that the vehicle pushes the cantilever arm out of its way thereby moving the cantilever arm to a retracted position, a sweep arm supported adjacent said cantilever arm so that it can move from a retracted position to an extended position and transfer a load off the deck of a moving vehicle, and means connecting said cantilever arm to said sweep arm so that the sweep arm moves to its extended position when said cantilever arm is moved to its retracted position by the force imparted to the cantilever arm by the vehicle whereby a separate motive force for the sweep arm is unnecessary.

13. Apparatus in accordance with claim 12 wherein said means connecting said cantilever arm to said sweep arm is selectively operable so that the cantilever arm may be pushed by a vehicle from its extended position to its retracted position without effecting movement of said sweep arm.

14. Apparatus in accordance with claim 13 wherein said connecting means includes a solenoid and plunger on one of said arms and structure on the other from for cooperation with said solenoid plunger, and said sweep arm being supported by a parallelogram.

* * * * *